United States Patent Office 3,714,103
Patented Jan. 30, 1973

3,714,103
SUSPENSION POLYMERIZATION OF VINYLIDENE HALIDE IN PRESENCE OF POLYVINYLIDENE HALIDE STABILIZER
Helmut Huhn, Walsrode, and Horst Kuhn, Fallingbostel, Germany, assignors to Wolff Walsrode Aktiengesellschaft, Walsrode, Germany
No Drawing. Filed Sept. 8, 1970, Ser. No. 70,513
Claims priority, application Germany, Sept. 11, 1969, P 19 45 970.2
Int. Cl. C08f 15/06, 15/40
U.S. Cl. 260—29.6 RB    3 Claims

ABSTRACT OF THE DISCLOSURE

A process for the continuous production of solid polyvinylidene halide resins which comprises the copolymerisation of a mixture of starting materials such as vinylidene halides, acrylonitrile, acrylic acid, methacrylic acid, itaconic acid and catalysts and emulsifiers together with a polymerised component of a solid polyvinylidene halide resin obtained by emulsion polymerisation by means of freezing coagulation.

PRIOR ART

Polyvinylidene halide resins, especially polyvinylidene chloride products, are being increasingly used, especially in the packaging industry, for the production of coatings and lacquers on films which cannot be sealed on account of their good sealing ability combined with their very low permeability to water vapour and gas and their clarity and excellent transparency.

The incorporation of comonomers which contain carboxyl groups is often necessary in order to improve the bonding of the lacquer to the support film. This gives rise to difficulties, especially if these polyvinylidene chloride products are produced by the method of suspension polymerisation, which is in itself advantageous, because products produced by this process at best have a compact and therefore only sparingly soluble bead structure. Even more inconvenient is the equally very frequent formation of large lumps of the polymerisation product which is due to the fact that in the course of the polymerisation reaction the individual droplets adhere to each other as they pass through the sticky stage so that in many cases a bead structure can never be obtained.

To avoid this disadvantage, so-called suspension parting agents in the form of mineral powders or water-soluble protective colloids have been used for the known suspension polymerisation processes. The substances frequently used for this purpose are inter alia kieselguhr, kaolin and talcum and the colloidal alkaline earth metal carbonates mentioned in German federal patent specification No. 1,007,061 or phosphates, sulphates or aluminium hydroxide mentioned in U.S. Pat. specification No. 2,538,049. The use of high molecular weight natural or synthetic protective colloids such as glycol cellulose, methyl cellulose, methyl hydroxypropyl cellulose, cholesterol, gelatin (German Reichs patent specification No. 735,284; and E. Trommsdorff: Makromolekulare Chemie 13, 80, 1954) or polyvinyl alcohol (U.S. Pat. specification No. 2,286,555), alkali metal salts of a polyacrylic and methacrylic acid (U.S. Pat. specification No. 2,133,257) and polyvinyl pyrrolidone (German federal patent specification No. 801,233) had also already been disclosed in the above mentioned prior publications.

The mineral and organic protective colloids mentioned above are not soluble in organic solvents such as chlorinated hydrocarbons, heterocyclic and hydrogenated ring compounds and benzene derivatives.

OBJECT OF THE INVENTION

It is therefore the object of this invention, to provide a process for the production of a suspension polymer, which must form a completely clear solution in an organic solvent in order to serve as a sealable lacquer component in packaging foils and which can easily be stripped off when dry and consists of uniformly porous fine particles which pour easily.

According to the invention, this object is achieved by a process for the production of solid polyvinylidene halide resins soluble in solvents by suspension polymerisation, which comprises the steps of forming a mixture of starting materials, which contains in addition to monomers selected from the groups consisting of vinylidene halides, vinyl halides, acrylonitrile, acrylic acid, methacrylic acid, itaconic acid, methyl methacrylate, itaconic acid esters or a mixture thereof and catalysts in the form of lauryl peroxide and emulsifiers in the form of sodium vinyl sulphonate and, in an amount of 0.01 to 15%, based on the starting materials, of at least one already polymerised component of a solid polyvinylidene halide resin obtained by emulsion polymerisation by means of freezing coagulation, which comprises the steps of freezing an aqueous dispersion while being passed through a vessel, breaking up the frozen mass, introducing it into a hot liquid for thawing whereby a suspension of the polymer in the molten liquid is obtained, introducing at least one of the aforesaid polymer components in the moist or dry state into the solution of at least one group of the solutions of the starting materials which are at first present in two separate groups, and combining the two groups which have hitherto been separate and polymerising them in the known manner. In the process for the production of solid polyvinylidene halide resins, it has been found especially advantageous to introduce 3 to 7% (based on the quantity of the monomers) of the aforesaid solid polyvinylidene halide resin stabilizer to a first aqueous solution of itaconic acid and an emulsifier in the form of sodium vinyl sulphonate, to which there is then added a second solution of vinylidene halide, methyl methacrylate, methacrylic acid and lauryl peroxide, and the total solution which then contains all the above mentioned reactants is polymerised in the conventional manner.

Owing to the fact that a pulverulent resin obtained by the aforesaid freezing coagulation according to the copending application Ser. No. 660,060, now U.S. Pat. 3,526,098, is used as a suspension parting agent which forms a clear solution in an organic solvent, the disadvantages inherent in the suspension parting agents known above, especially as regards their poor solubility in organic solvents, no longer occur. In addition, owing to its related chemical composition, the polymer resin used as the suspension parting agent according to the invention has almost the same solubility and lacquer properties (bond strength and permeability to water vapour) as the polyvinylidene halide resin prepared according to the invention by suspension polymerisation.

The polyvinylidene halide resin obtained by the suspension polymerisation process according to the invention is distinctly superior to other resins obtained by the emulsion polymerisation process (including also the product obtained by the process of copending application Ser. No. 660,060 now U.S. Pat. 3,526,098 of the applicants') in its solubility in organic solvents and resistance to clouding, so that the special value of this emulsion polymerisation resin lies in its capacity to be used as a suspension parting agent in the process according to the invention. Thus, the average improvement in the rate of solution of the suspension resin according to the invention compared with the above mentioned emulsion resin is on an average 60% of the usual solution time, the solution rate being determined in each case on a 20% solution of the comparison resin prepared by stirring in a solvent mixture of tetrahydrofuran and toluene in the ratio of 70:30 and at a bath temperature of 50° C.

If 20% solutions of the two comparison resins are again used for determining the turbidity which is measured in a Lange colorimeter, the substances being stored at room temperature at 20° C., the turbidity of the emulsion resin rises from 10 to 64% within 10 days after its preparation under the conditions described above, whereas the turbidity of the suspension resin prepared according to the invention (see Example 7) only rises from 10 to 15% within the same period.

For technical reasons associated with the machinery, e.g. in the case of high speed packaging machines, the lacquer components used for cellulose foils, e.g. polyvinylidene halide resins, are desired to have low sealing temperatures on account of the heat sensitivity of the cellulose foils. This is much more easily achieved with lacquers whose resins have been produced by the suspension polymerisation process according to the invention than with lacquers which have been produced from a polyvinylidene halide resin which has been obtained by the emulsion polymerisation process.

When the sealing values (determined in p/15 mm. at 23° C. and a lacquer application of 2 g./m.$^2$) of lacquers obtained from polyvinylidene halide resins produced according to Examples 1, 2, 3, 6 and 7 below and the sealing values of a comparison lacquer which has been obtained by the emulsion polymerisation process from a polyvinylidene halide resin are plotted against sealing temperatures of 80° C., 90° C., 100° C., 110° C., 120° C., 140° C. and 160° C., the following table is obtained:

TABLE.—SEALING VALUES

| | Sealing temperature in ° C. | | | | | | |
|---|---|---|---|---|---|---|---|
| | 80 | 90 | 100 | 110 | 120 | 140 | 160 |
| Lacquer from the resin— | | | | | | | |
| According to Example 1 | 140 | 140 | 190 | 180 | 170 | 170 | 160 |
| According to Example 2 | 0 | 70 | 120 | 145 | 175 | 210 | 190 |
| According to Example 3 | 110 | 120 | 190 | 210 | 180 | 200 | 175 |
| According to Example 6 | 180 | 160 | 160 | 140 | 150 | 160 | 170 |
| According to Example 7 | 185 | 195 | 150 | 180 | 185 | 175 | 185 |
| Comparison lacquer from the emulsion resin | 0 | 0 | 40 | 90 | 170 | 200 | 190 |

In all the above cases, the support for the lacquer is a foil of regenerated cellulose from the same batch having a weight per unit area of 30 g./m.$^2$.

The process according to the invention will now be described more fully with the aid of the following examples but is not restricted to them.

apply in all cases are not mentioned separately in the following examples. The solubility test of the products produced in the examples is carried out in all cases by stirring 1 part of the dry polymer into 4 parts of a solvent mixture of 70 parts of tetrahydrofuran and 30 parts of toluene at a bath temperature of 50° C.

EXAMPLE 1

Solution I is prepared by stirring 100 g. of a resin which has been produced by emulsion polymerisation and then obtained by freezing coagulation from the monomers vinylidene chloride (88.5%), methyl methacrylate (2.25%), acrylonitrile (7.25%) and itaconic acid (2%) into a solution of 4500 g. of water, 45 g. of the monomethyl ester of itaconic acid and 45 g. of sodium vinyl sulphonate. The resulting solution is heated in an autoclave at 50° C. with stirring. Solution II consisting of 2000 g. of vinylidene chloride, 170 g. of acrylonitrile, 57 g. of methyl methacrylate, 45 g. of methacrylic acid and 40 g. of lauryl peroxide is then added to solution I in several portions over a period of 2 hours.

The suspension polymer obtained at the end of the reaction is removed by suction filtration, dried and then dissolved for the lacquer tests. The relatively uniformly fine-grained product had an average particle diameter of 0.8 mm. and formed a clear solution in tetrahydrofuran/toluene.

EXAMPLE 2

In this case, instead of 45 g. of itaconic acid ester, an equal quantity of itaconic acid was used as one of the starting components. The other starting components were unchanged but the time for adding solution II to solution I was increased from 2 hours to 3 hours. The products obtained had a slightly smaller average particle diameter (0.7 mm.). No other differences in the end product could be detected.

EXAMPLE 3

In this case larger quantities of itaconic acid and of vinylidene chloride were used as the starting components than in Examples 1 and 2 so that in proportion less emulsion resin according to the invention was used. Although solution II was added very carefully to solution I over a period of 3 hours, the average particle diameter of the end product increased from the value of 0.7 mm. obtained in Example 2 to 1.0 mm. in Example 3.

100 g. of an emulsion resin obtained by freezing coagulation were stirred into a solution of 4500 g. of water, 67.5 g. of itaconic acid and 45 g. of sodium vinyl sul-

SUMMARY OF EXAMPLES 1 TO 13

| Ex. | Polymeric suspension parting agent added to the monomers (in g.) | Emulsifier (sodium vinyl sulphonate) | Scale of quantities used | Average particle diameter (in mm.) | Solubility in tetrahydrofuran/toluene |
|---|---|---|---|---|---|
| 1 | 100 g. of the emulsion polymer according to the invention | Yes | Laboratory | 0.8 | Clear solution. |
| 2 | do | Yes | do | 0.7 | Do. |
| 3 | do | Yes | do | 1.0 | Do. |
| 4 | Without parting agent | Yes | do | $^1$10.0+ | Insoluble. |
| 5 | do | Yes | do | $^1$10.0+ | Do. |
| 6 | 100 g. of the emulsion polymer according to the invention | No | do | 0.6 | Clear solution. |
| 7 | 3,200 g. of the emulsion polymer according to the invention | No | Commercial | 0.5 | Do. |
| 8 | Without parting agent | No | Laboratory | $^1$0.5–10.0+ | Cloudy solution. |
| 9 | 3,200 g. of end product of the suspension polymer of Example 7 | No | Commercial | 10.0 | Very sparingly soluble. |
| 10 | 300 g. of end product of suspension polymer of Example 7 | No | Laboratory | $^2$1.5 | Sparingly soluble. |
| 11 | 400 g. of end product of suspension polymer of Example 7 | No | do | $^2$1.3 | Cloudy solution. |
| 12 | 100 g. of finest grained polymer | No | do | $^1$2.0 | Insoluble. |
| 13 | Without parting agent but instead of 2,000 g. of vinylidene chloride (as in Examples 1–12) 2,000 g. of prepolymer (vinylidene chloride, acrylic acid, lauryl peroxide) added. | No | do | 0.6 | Do. |

$^1$ Lumps.  $^2$ Irregular.

In all the examples, the reaction was carried out for 20 hours in an enamelled vessel equipped with a stirrer between solution I which was heated to 50° C. and solution II, wherein solution II, which was at a temperature of 20° C., was stirred at an average rate of 110 revs./min. either within a period of 2 or 4 hours (according to the example) or immediately, the mixture of solutions I and II, was kept as 50° C. These reaction conditions which phonate. The resulting solution I was heated to 50° C. in an autoclave.

Solution II containing 2100 g. of vinylidene chloride, 150 g. of acrylonitrile, 57 g. of methyl methacrylate, 22.5 g. of methacrylic acid and 40 g. of lauryl peroxide was added at a temperature of 20° C. over a period of 3 hours, and after a reaction of 20 hours, the reaction product was treated as in Example 1 and dissolved. The average particle diameter of the product was 1.0 mm. and the product formed a clear solution in tetrahydrofuran/toluene.

EXAMPLE 4

In this case, in contrast to Examples 1 to 3, no emulsion polymerisation product was added to the monomer solution I. The other starting components and reaction conditions were the same as in Example 1 of the process according to the invention. When the particle diameter was determined in the isolated granular product, it was found that 70% of the particles had a diameter of 1.5 mm. and 30% a particle diameter of 10 mm. The product was, therefore, very irregular and coarse. Moreover, the product was not soluble in tetrahydrofuran/toluene.

EXAMPLE 5

In this case the same starting components were used as in Example 4 but the time taken to add solution II to solution I was increased from 2 hours to 3 hours. Although as a result of this the proportion of the coarse particles (i.e. particles having an average diameter of 10 mm.) could be reduced to 15%, this product was again completely insoluble in tetrahydrofuran/toluene and therefore could not be used to prepare a lacquer which would form a clear solution.

EXAMPLE 6

This example is similar to Example 2 above as regards the starting components and the method of carrying out the process, but the emulsifier (sodium vinyl sulphonate) hitherto used in all cases is omitted and, moreover, solution II was in this example (as also in the following examples) not added slowly but within 30 seconds and without measuring the rate of addition.

4500 g. of water and 45 g. of itaconic acid were added, into which 100 g. of the emulsion resin were stirred as in Example 2 to produce solution I. After heating this solution to 50° C., solution II containing 2000 g. of vinylidene chloride, 170 g. of acrylonitrile, 57 g. of methyl methacrylate and 40 g. of lauryl peroxide was added within 30 seconds. A very fine grain having a diameter of 0.6 mm. could be obtained. The product formed a clear solution in tetrahydrofuran/toluene. From this it follows that the absence of the emulsifier has no adverse influence on the ability of the end product to form a clear solution and on its particle size provided that the emulsion polymer is added according to the invention to the monomer mixture.

EXAMPLE 7

In this case the laboratory test carried out above (Example 6) was converted to a small industrial scale in order to determine whether the advantageous results as regards particle diameter and clear solubility were also reproducible on this scale.

3200 g. of the emulsion resin just mentioned were stirred in the manner described above into a solution of 1445 g. of itaconic acid in 144,500 g. of water, and the resulting solution I was heated to 50° C. in an autoclave. A solution II of 65,250 g. of vinylidene chloride, 5470 g. of acrylonitrile, 1830 g. of methyl methacrylate and 1285 g. of lauryl peroxide are then added to this solution I within 30 seconds. After a reaction time of 20 hours, the product is examined to determine its particle size and its solubility in tetrahydrofuran/toluene. It was found to have an average particle diameter of 0.5 mm. The product dissolved uniformly to form a clear solution in tetrahydrofuran/toluene. As shown in the table above, a lacquer produced from this product has a sealing value of 185 at only 80° C., whereas a comparison lacquer obtained from emulsion resin reached this value only at a sealing temperature of over 120° C. The resin produced according to the invention was, therefore, eminently suitable for carefully sealing cellulose support foils coated with it.

EXAMPLE 8

This example serves as a comparison for Example 6 but in this experiment, which was carried out on a laboratory scale, no emulsion polymer was added to the starting monomers in solution I. The particle diameters were consequently very irregular: 53.5 % of the product was found to have a particle diameter of 0.5 mm., 27% a diameter of 10 mm. and 19.5% of the product appeared as a rubbery layer of deposit on the wall of the reaction vessel. The copolymer was only very sparingly soluble in tetrahydrofuran/toluene. The dissolved portions were cloudy. The product could not be used for lacquering support foils.

EXAMPLE 9

In this example, in contrast to Example 7, it was intended to investigate whether the resin (obtained through emulsion polymerization by the freezing coagulation process) added in accordance with the invention to the monomers could be replaced by an equal quantity of the end product obtained in Example 7 by suspension polymerization.

3200 g. of the end product according to the invention obtained in Example 7 were stirred into a solution of 1445 g. of itaconic acid in 144,500 g. of water, and the resulting solution I was heated to 50° C. in an autoclave. A solution II of 65,250 g. of vinylidene chloride, 5470 g. of acrylonitrile, 1830 g. of methyl methacrylate and 1285 g. of lauryl peroxide, at a temperature of 20° C., was stirred into solution I within 30 seconds so that solution I plus the amount of solution II added to it were continuously kept at a temperature of 50° C. The beady granular end product had an average particle diameter of up to 10 mm. and was, therefore, very coarse and, moreover, it was very sparingly soluble in tetrahydrofuran/toluene. Replacing the emulsion polymer mentioned above by an equal quantity of the suspension polymer according to the invention did not result in satisfactory products.

EXAMPLE 10

In this example the quantity of the emulsion polymer added was not replaced, as in Example 9, by an equal quantity of an end product from Example 7 but by three times the quantity of end product from Example 7, in order to see whether reusing substantial quantities of the polymerised "substitute product" according to the invention might not result in a product equal in quality to the product according to the invention.

Instead of the emulsion resin, 300 g. of an end product of the resin prepared according to the invention by suspension polymerization according to Example 7 were stirred into an aqueous solution of 45 g. of itaconic acid in 4500 g. of water, and the resulting solution I was heated to 50° C. in an autoclave. Solution II containing 2000 g. of vinylidene chloride, 170 g. of acrylonitrile, 57 g. of methacrylate and 40 g. of lauryl peroxide, at a temperature of 20° C., was added to solution I. Solution I plus the amount of solution II added to it were maintained at a temperature of 50° C. during and after the addition of solution II.

A resin which was very irregular in its structure according to its average particle size and shape was obtained. It had an average particle diameter of 1.5 mm. and was only sparingly soluble in tetrahydrofuran/toluene and could not be used as a lacquer for support foils.

EXAMPLE 11

The same starting components as in Example 10 were subjected to the same course of reaction and polymerised, the only difference being that the quantity of the suspension polymer resin used was increased to 400 g. (instead of 300 g. as in Example 10). The polymerised, washed and dried end product formed a cloudy solution in tetrahydrofuran/toluene and, therefore, could not be used as a lacquer in the form mentioned above.

EXAMPLE 12

In this case the quantity of the resin (obtained by emulsion polymerisation in the freezing coagulation process) added according to the invention to the monomers in Example 7 was not, as in Example 9, replaced by an equal quantity of a relatively coarser end product obtained by suspension polymerisation according to Example 7 but by an equal quantity of a very fine grained polymer having an average particle diameter of 0.001 mm. This fine grained polymer had not been obtained by emulsion polymerisation in a freezing coagulation process.

This was intended to test whether the advantages of the end product produced according to the invention would also be obtained if one observes the important factor of reducing the particle size but dispenses with the use according to the invention of the resin obtained by emulsion polymerisation in the freezing coagulation process.

300 g. of a 33% liquor, i.e. a liquor having a solids content of 100 g. of a fine grained end product having an average particle size of 0.001 mm., which end product had been obtained by the polymerisation of a monomer mixture of 2000 g. of vinyl chloride, 170 g. of acrylonitrile and 57 g. of methyl methacrylate with the addition of 0.25% of a water-soluble initiator but in the absence of an emulsifier in an aqueous solution of 45 g. of itaconic acid in 4500 g. of water are introduced into an aqueous solution of 45 g. of itaconic acid in 4500 g. of water. The resulting solution I is heated to 50° C. in an autoclave. Solution II containing 2000 g. of vinylidene chloride, 170 g. of acrylonitrile, 57 g. of methyl methacrylate and 40 g. of lauryl peroxide were then added at 20° C. to solution I, the temperature of solution I to which solution II was added being maintained at 50° C. The reaction product obtained after a reaction time of 20 hours followed by washing, drying and working up is granulated in the form of particles to an extent of 60%. These particles have an average diameter of 2 mm., 40% however of the reaction product stick together as a mass adhering to the reaction vessel. The product is insoluble in tetrahydrofuran/toluene and, therefore, cannot be used for the production of a lacquer.

It follows from this that the use according to the invention of a resin obtained by emulsion polymerisation in the freezing coagulation process cannot be replaced by an equal quantity of a resin which has not been produced by this process, even if the last mentioned resin has a much finer grain than the product used according to the invention.

EXAMPLE 13

This comparison example serves to demonstrate the excellent properties of the polyvinylidene halide resin produced by the suspension polymerisation process according to the invention with the addition of emulsion resin to the starting monomers. For this purpose, instead of carrying out the addition according to the invention of emulsion resin obtained by freezing coagulation to the aqueous solution of itaconic acid (solution I), the monomer component of 2000 g. of vinylidene chloride in solution II was replaced by 2000 g. of a prepolymer. This experiment was carried out on a laboratory scale as follows:

A solution II containing 2000 g. of a prepolymer of 97.5% of vinylidene chloride, 2% of acrylic acid and 0.5% of lauryl peroxide is added at a temperature of 20° C. to an aqueous solution of 67.5 g. of itaconic acid in 4500 g. of water which has been heated to 50° C. in an autoclave (solution I without the suspension resin), and in addition there are added 170 g. of acrylonitrile, 57 g. of methyl methacrylate and 40 g. of lauryl peroxide. The mixture of solution I and solution II is kept at a temperature of 50° C.

After the usual reaction time of 20 hours and working up of the product, a very uniform and fine grained suspension polymer was obtained which had an average particle diameter of 0.6 mm., but it was insoluble in tetrahydrofuran/toluene. The product, therefore, could not be used for lacquering foils.

It follows from the above examples that only the emulsion polymer prepared according to the copending application Serial No. 660,060, now U.S. Pat. 3,526,098 by freezing coagulation can be used according to the invention as a reliable suspension parting agent for producing by suspension polymerisation a polyvinylidene halide resin which is sufficiently soluble to form a clear solution and which in the solid state has a uniform particle size and is easily pourable (Examples 1, 2, 3, 6 and 7).

What we claim is:

1. In the process for production of solid polyvinylidene halide resins by suspension polymerization of a vinylidene halide monomer with at least one polymerizable monomer selected from the group consisting of vinylidene halide, vinyl halide, acrylonitrile, acrylic acid, methacrylic acid, itaconic acid, methyl methacrylate, itaconic acid esters, and mixtures thereof, the improvement which comprises adding to the polymerizable monomers 0.01 to 15% by weight of a stabilizer consisting essentially of a solid emulsion polymerized and freeze coagulated polyvinylidene halide resin.

2. Process of claim 1 wherein 3-7% of the stabilizer is added.

3. Process of claim 2 wherein the stabilizer is first added to an aqueous solution of a minor amount of polymerizable monomer consisting of itaconic acid and to this medium is added a solution containing a major amount of polymerizable monomer consisting of vinylidene halide.

References Cited

UNITED STATES PATENTS 3,379,665   4/1968   Lyon et al. _____ 260—29.6
3,526,098   9/1970   Huhn et al. _____ 462—58

MURRAY TILLMAN, Primary Examiner

J. SEIBERT, Assistant Examiner

U.S. Cl. X.R.

117—145, 161 UZ, 161 UT, 161 UN, 161 UC; 260—881, 884